(12) United States Patent
Reinhardt et al.

(10) Patent No.: US 12,396,590 B2
(45) Date of Patent: Aug. 26, 2025

(54) CONTAINER FOR RECEIVING, STORING AND SERVING FOOD

(71) Applicant: WMF GmbH, Geislingen An der Steige (DE)

(72) Inventors: Kevin Reinhardt, Waldkirch (DE); Julian Maier, Pforzheim (DE)

(73) Assignee: WMF GmbH (DE)

( * ) Notice: Subject to any disclaimer, the term of this patent is extended or adjusted under 35 U.S.C. 154(b) by 181 days.

(21) Appl. No.: 18/272,263

(22) PCT Filed: Jan. 13, 2022

(86) PCT No.: PCT/EP2022/050641
§ 371 (c)(1),
(2) Date: Jul. 13, 2023

(87) PCT Pub. No.: WO2022/152790
PCT Pub. Date: Jul. 21, 2022

(65) Prior Publication Data
US 2024/0065474 A1    Feb. 29, 2024

(30) Foreign Application Priority Data
Jan. 13, 2021  (DE) ..................... 10 2021 200 271.4

(51) Int. Cl.
*A47J 36/06*  (2006.01)
*A47J 36/10*  (2006.01)
(Continued)

(52) U.S. Cl.
CPC ........... *A47J 36/2405* (2013.01); *A47J 36/10* (2013.01); *A47J 47/02* (2013.01)

(58) Field of Classification Search
CPC ........ A47J 36/2405; A47J 36/24; A47J 36/06; A47J 36/10; A47J 47/02; E05D 11/06; E05D 11/10; E05D 11/105; E05D 1/04; B65D 43/164; B65D 43/166; B65D 43/24; B65D 2251/1058
(Continued)

(56) References Cited

U.S. PATENT DOCUMENTS

| | | |
|---|---|---|
| 2003/0218000 A1 | 11/2003 | Haber |
| 2005/0279225 A1 | 12/2005 | Chang |
| 2008/0010778 A1* | 1/2008 | Tse .......................... E05F 3/14 16/82 |

FOREIGN PATENT DOCUMENTS

| | | |
|---|---|---|
| CN | 112144997 A | 12/2020 |
| DE | 69608858 | * 1/2001 |
| DE | 69608858 T2 | 1/2001 |

OTHER PUBLICATIONS

DE69608858 English Translation, Accessed on Mar. 4, 2025 (Year: 2001).*

(Continued)

*Primary Examiner* — King M Chu
(74) *Attorney, Agent, or Firm* — Lerner David LLP (57) ABSTRACT

The invention relates to a container for receiving, keeping warm and/or serving food, wherein the container comprises a base body that can be closed by means of a lid. According to one aspect, a brake is provided, which brakes a closing movement of the lid. According to another aspect, a connecting module for connecting the lid to the base body is provided, wherein the connecting module is detachably connected both to the lid and to the base body.

20 Claims, 9 Drawing Sheets

(51) Int. Cl.
*A47J 36/24* (2006.01)
*A47J 47/02* (2006.01)

(58) Field of Classification Search
USPC .... 49/386, 384, 176; 160/318, 351, 191, 92,
160/127; 220/832, 254.3, 810, 831, 829,
220/840
See application file for complete search history.

(56) References Cited

OTHER PUBLICATIONS

International Search Report issued in Appln. No. PCT/EP2022/050641 mailed May 13, 2022 (2 pages).

* cited by examiner

CONTAINER FOR RECEIVING, STORING AND SERVING FOOD

CROSS-REFERENCE TO RELATED APPLICATIONS

The present application is a national phase entry under 35 U.S.C. § 371 of International Application No. PCT/EP2022/050641, filed Jan. 13, 2022, which claims priority from German Patent Application No. 102021200271.4 filed Jan. 13, 2021, all of which are incorporated herein by reference.

BACKGROUND OF THE INVENTION

The invention relates to a container for receiving, keeping warm and/or serving food, wherein the container comprises a base body that can be closed by means of a lid. According to one aspect, a brake is provided, which decelerates (brakes) a closing movement of the lid. According to another aspect, a connecting module for connecting the lid to the base body is provided, wherein the connecting module is detachably connected both to the lid and to the base body.

Containers for receiving, storing and serving food are used, for example, at buffets to keep food warm in a water bath. The containers typically comprise a pan-shaped base body (trough-shaped base body), which can be closed by a lid. The containers are known in a wide variety of embodiments, for example including flat or curved lids, which can be opened or closed as needed to store, and possibly showcase, the foodstuffs stored in the container in a fresh and appealing for as long as possible. These containers are also known, amongst others, in the food service industry under the term "chafing dish."

One problem with these devices can be the handling of the lid. Removable lids, which are only placed on the base body for closing the same and not connected thereto in an articulated manner, require an additional space for setting it down that must be kept clear. Lids that can be pivoted about horizontal axes and are connected to the base body in an articulated manner, in turn, should be pivotable completely to the rear, for example to be able to remove a water bath vessel. In the process, there is a risk that the server may lose his or her controlled grip of the relatively heavy lids and that the lids are flipped toward the back and down, whereby the vessel on the table could be moved, the water for keeping the food warm could slosh, and food could be spilled. When the lid is being closed, the server must reach far to the rear and down to grab the lid. A need therefore exists for refining the closing mechanism of the lid.

At times, it is desirable to be able to completely demount the lid, which is connected to the base body in an articulated manner, from the base body. For example, it may be desirable to clean the lid separately from the base body in dishwasher. Even though some previously known lids can be removed, these contain mechanical components which are not suited, or are only conditionally suited, for use in dishwashers. Other lids can only be removed from the base body using a tool intended for this purpose. It would be advantageous to find a practical solution for a removable lid.

BRIEF SUMMARY OF THE INVENTION

It is the object of the invention to design a container for receiving, keeping warm and/or serving food that is able to at least partially solve the above-described problems.

This object is achieved by a container having the features of the main claim. Further embodiments of the invention are defined by the subject matter of the dependent claims and the description below.

According to a first aspect, a container, in particular for receiving, keeping warm and/or serving food, is provided. The container comprises:
- a base body;
- a lid for closing the base body which can be pivoted between a closed position and an open position by means of a rotary joint (revolute joint); and
- at least one brake for braking (decelerating) a pivoting movement of the lid and/or for holding the lid in a position between the closed position and the open position.

The brake comprises a freewheel and is configured so as to brake (decelerate) a pivoting movement of the lid in the closing direction, while not braking (decelerating) a pivoting movement of the lid in the opening direction.

The freewheel typically defines a blocking direction and a freewheeling direction. The blocking direction preferably corresponds to the closing direction of the lid and/or the freewheeling direction corresponds to the opening direction of the lid. In other words, the freewheel is coupled to a pivoting movement of the lid in such a way that the brake brakes (decelerates) or holds the lid in the closing direction, not, however, in the opening direction.

The brake can in particular be designed to hold the lid in a plurality of positions, preferably in an infinitely adjustable manner (steplessly), between the closed position and the open position. The open position denotes the position in which the lid is maximally opened and thus has a maximum opening angle. The maximum opening angle can be established by at least one stop. In this case, the pivoting movement of the lid is thus limited by the stop. In the closed position, the lid completely covers the base body. As a result of the brake, it is thus typically achieved that the lid stays in virtually any position between the closed position and the open position. The user thus only has to move the lid into a position in which the food is accessible, with the lid automatically remaining in this position after being released due to the braking force of the brake. This also means that a minor manual force for overcoming the braking force of the brake is required for closing the lid. This required manual force is usually the greatest in an open vertical state of the lid, for example at approximately 90°, and steadily decreases during closing due to the increasing lever arm. Typically, during the intended use of the container, the lid is oriented substantially horizontally in the closed position, that is, perpendicular to the force of gravity.

Optionally, the brake is a mechanical friction brake. In other words, the braking force is generated by friction between a fixed body and a moving body. Such brakes are typically robust and characterized by a comparatively simple design. In one embodiment, the brake comprises at least one brake pad and a brake disk. It may be provided that the brake disk is arranged so as to be static with respect to the base body. The brake pad can move relative to the base body during a movement of the lid. As an alternative, the brake pad is arranged so as to be static (stationary) with respect to the base body. In this case, the brake disk moves relative to the base body during a movement of the lid.

In some embodiments, the rotary joint (revolute joint) comprises a rotatable shaft that is coupled to the freewheel and connected to the lid. The shaft in general rotates synchronously with a pivoting movement of the lid, that is, both elements are rotated by the same angle of rotation when the lid is being pivoted. Optionally, the brake is configured in such a way that the brake pad and the brake disk are static (stationary) relative to one another in the freewheeling direction of the shaft, and a relative movement of the brake pad and of the brake disk in the blocking direction of the shaft is braked (decelerated). Furthermore, a spring element may be provided, wherein the spring element is configured to push the brake pad and the brake disk together in the axial direction.

The shaft can be surrounded by a bearing bushing. The shaft can be arranged or mounted in an interior space defined by the bearing bushing. The bearing bushing can be connected to at least one cover, which closes the interior space defined by the bearing bushing at least in regions. The brake pad can, for example, be non-rotatably connected to the bearing bushing, for example by way of form fit.

The freewheel can be mounted on the shaft, for example. The freewheel is often configured as a one-way roller clutch. Optionally, the freewheel is arranged radially between the bearing bushing and the shaft. In one embodiment, at least one rolling bearing is arranged radially between the bearing bushing and the shaft, for example two rolling bearings or, if needed, even more than two. As an alternative or in addition, it may also be provided that at least one rolling bearing is integrated into the freewheel. At least one sealing element can be provided, which is configured to seal the freewheel and/or the at least one rolling bearing with respect to water and moisture. The brake can moreover be arranged in a housing, wherein the housing can sometimes comprise two partial housings. For example, the brake can be arranged in or at a connecting module, which connects the lid to the base body. In particular the connecting module described further below is a suitable connecting module.

The brake disk can surround the shaft, the freewheel and/or the bearing bushing in the radial direction. Optionally, a sliding bearing is arranged radially between the bearing bushing and the brake disk, which enables a rotation, preferably a low-friction rotation, of the bearing bushing relative to the brake disk.

Overall, a low-noise braking function and a long service life can be achieved with the brake of the above-described kind. Furthermore, infinitely adjustable lid positioning (stepless lid positioning) is made possible by the described brake. The brake is furthermore characterized by a small number of components and easy assembly.

According to a second aspect, a further container, in particular for receiving, keeping warm and/or serving food, is described. The container comprises:
a base body;
a lid for closing the base body which can be pivoted between a closed position and an open position; and
a connecting module for connecting the lid to the base body.

The connecting module comprises a first connecting element, which is detachably connected to the lid. Furthermore, the connecting module comprises a second connecting element, which is detachably connected to the base body. The connecting module moreover comprises at least one component for influencing a pivoting movement of the lid.

The expression "detachable connection" shall in particular be understood to mean that the connection can be detached non-destructively and without tools. In this way, the connecting module makes modular coupling of the lid to the base body possible. In particular, the connecting module can be demounted both from the base body and from the lid. Due to the modularity of the coupling, the base body, the lid and the connecting module can be individually replaced, repaired and/or cleaned. For example, the base body and the lid can be cleaned separately from the connecting module. This may in particular be useful when the connecting module or the components thereof, such as the aforementioned component for influencing the pivoting movement of the lid, are sensitive to water, moisture and/or cleaning agents.

The aforementioned component can comprise or be a brake for braking (decelerating) a pivoting movement of the lid and/or for holding the lid in a position between the closed position and the open position. The brake can be configured similarly to the brake described with respect to the first aspect. As an alternative or in addition, the aforementioned component can comprise or be a motor element for moving the lid between the closed position and the open position. The connecting module can comprise a housing in which the component is arranged.

Optionally, the first connecting element comprises a first form fit element, which can be connected to a first counter-piece attached to the lid for forming a first form fit. For example, the first form fit element is configured as a protrusion, while the first counter-piece in a complementary manner comprises a first receptacle having a complementary shape.

In one refinement, a first spring-loaded pressure piece (spring plunger) is provided, which engages in a first locking depression when the first form fit is present. The first spring-loaded pressure piece (spring plunger) can help fix the first form fit. The first spring-loaded pressure piece is installed in the first form fit element, for example. Moreover, the first locking depression can be formed in the first counter-piece. The first locking depression is usually formed in an inner wall of the counter-piece. As an alternative, the first spring-loaded pressure piece can also be installed in the counter-piece. In this case, the first locking depression is formed in the first form fit element.

The first connection can preferably be released starting at an opening angle of the lid of at least 45°, without the base body having to be held in place manually. A spring force or holding force of the first spring-loaded pressure piece and/or the geometry of the first form-fit connection can be designed in such a way that the manual force required for releasing the first connection is generally the lowest at an opening angle of the lid between 80° and 100°, preferably between 85° and 95°, and in particular approximately 90°. For example, at a certain opening angle, in particular 90°, of the lid, a longitudinal axis (or longitudinal direction) of the first form fit element and a longitudinal axis (or longitudinal direction) of the first counter-piece extend parallel to the force of gravity, so that the form-locked connection between the lid and the first connecting element in the open position can be released by lifting of the lid.

Optionally, the second connecting element comprises a second form fit element, which can be connected to a second counter-piece attached to the base body for forming a second form fit. Often times, a second spring-loaded pressure piece (spring plunger) is provided, which latches in a second locking depression when the second form fit is present. The second spring-loaded pressure piece (spring plunger) can help fix the second form fit.

The second spring-loaded pressure piece can be installed in the second form fit element, for example. Moreover, the second locking depression can be formed in the second counter-piece. The second locking depression is usually formed in an inner wall of the second counter-piece.

As an alternative, the second spring-loaded pressure piece can also be installed in the second counter-piece. In this case, the second locking depression is formed in the second form fit element.

In some embodiments, the second form fit element engages in a second receptacle formed in the counter-piece. The second form fit element is configured as a stud, for example, while the second receptacle has a complementary shape. The second locking depression is usually formed in an inner wall of the second receptacle. Furthermore, the second spring-loaded pressure piece can be installed in the second form fit element. A longitudinal axis of the second spring-loaded pressure piece can extend in particular at an angle, preferably perpendicularly, with respect to a longitudinal axis of the second form fit element. The second locking depression can be configured as a through-opening, so that the second spring-loaded pressure piece can be detached from the outside, preferably by pushing it with a finger.

A third spring-loaded pressure piece (spring plunger), which is preloaded when the second spring-loaded pressure piece is latched, can be provided for releasing the second form fit. The third spring-loaded pressure piece (spring plunger) can be configured to push the second form fit element at least partially out of the receptacle when the second pressure piece is released from the second locking depression. A longitudinal axis of the third spring-loaded pressure piece can be oriented parallel to the longitudinal axis of the second form fit element and/or perpendicularly to the longitudinal axis of the second spring-loaded pressure piece.

In some embodiments, the third spring-loaded pressure piece is installed in the second form fit element. The third spring-loaded pressure piece can rest against the inner wall of the receptacle when the second spring-loaded pressure piece is latched. Optionally, a third depression can be formed in the inner wall of the receptacle, in which the third pressure piece engages.

At least one of the above-described spring-loaded pressure pieces can comprise a sleeve and a spring element arranged in the sleeve, as well as a pressure piece that is partially arranged in the sleeve and partially protrudes from the sleeve, such as a ball or a pin. The spring element is designed to exert a spring force on the pressure piece, whereby the pressure piece is preloaded.

Typically, the first connecting element and the second connecting element are connected to one another by way of a center piece, wherein the component for influencing a pivoting movement of the lid is optionally attached to the center piece or installed in the center piece.

Sometimes, the container can comprise two connecting modules of the described kind. It may be provided that the longitudinal directions of the first form fit elements extend parallel to one another and point in the same direction. The first form fits can also be released simultaneously by pulling on the lid. It may additionally be provided that the longitudinal directions of the second form fit elements run parallel to one another, but are oriented in opposite directions (anti-parallel). As a result, the second form fits cannot be released while the lid is still attached to the connecting modules. Instead, the second form fits (that is, the connection of the connecting modules to the base body) can only be released when the lid has been demounted from the connecting module. This can reduce the likelihood that the lid is cleaned together with the connecting modules.

The base body is often times shaped like a trough (pan). The base body in general comprises a bottom surface, a front wall, a rear wall and two side walls, wherein the connecting module is preferably attached to the rear wall of the base body, and in particular to an upper side of the rear wall. The rear wall can extend in the lateral direction from a first end section to a second end section, wherein the end sections are each connected to a side wall. The connecting modules are preferably attached in the end sections of the rear wall. The reason for this outwardly provided connection of the connecting modules is that the flexural rigidity of the side walls and/or of the corner radii is utilized. In this way, bending of the rear wall while the lid is being opened or closed can be prevented or reduced. As a result, in turn, additional rear wall reinforcement panels can be omitted. The bottom surface, the front wall, the rear wall, the side walls and/or the base body can thus be designed in one piece. In addition to decreased manufacturing costs, this can ensure an appealing appearance and/or a decreased cleaning effort.

Sometimes, at least one bearing pedestal is provided in the base body for the connection to the second connecting element.

The connection of the connecting module to the base body can be designed in such a way that the connecting module can be removed easily and without tools, and can thus be replaced. In addition to the removability and the associated handling and maintenance friendliness, it is also possible to create the option of exchanging or upgrading the component for influencing a pivoting movement of the lid with another component at a later point in time, without having to redesign the base body and/or the lid.

In this way, the modularity can also provide different versions of the connecting module (for example, with motor element/without motor element and/or with brake/without brake), which are interchangeable among one another. In this respect, it is also possible to provide a system by way of the invention which comprises the base body, the lid and at least two connecting modules, wherein the connecting modules preferably each comprise a different component for influencing the pivoting movement of the lid.

Individual features of the container according to the first aspect can be combined with features of the container according to the second aspect, and vice versa. In a preferred embodiment, the container according to the first aspect and the container according to the second aspect have the same features.

In further specific embodiments, the container according to one of the above-described aspects can be part of a system including additional components. Additionally, a water bath vessel can be provided, which is accommodated by the base body. A space that is formed between the base body and the water bath vessel can be filled with water. A heating device may be provided to heat the water and/or keep it warm. The container can, for example, be arranged on a rack including a heating device therebeneath, wherein, for example, fuel cans or electrical heating elements can be used as the heating device.

BRIEF DESCRIPTION OF THE DRAWING

The invention will be described in more detail based on the accompanying figures. In the drawings.

DETAILED DESCRIPTION

In the following description and in the figures, recurring and functionally equivalent features are denoted by the same reference numerals. For the sake of clarity, some of the reference numerals are not provided in every example, even though the associated elements may be present in the relevant example.

FIGS. 1-5 show differing views of a container 1 for receiving, keeping warm and/or serving food. The container 1 comprises a trough-shaped (tub-shaped) base body 2 and a lid 10 for closing the base body 2, which can be pivoted about a pivot axis 40 between a closed position and an open position, the container 1 being shown in the closed state. The container 1 can optionally be arranged on a rack including a heating device therebeneath, wherein fuel cans or electrical heating elements are often used as the heating device. The base body 2 in general forms a receptacle for a likewise trough-shaped water bath vessel (not shown) in which food can be kept warm, wherein water is typically present between the base body 2 and the water bath vessel when the container 1 is in use so that the water bath vessel is situated in a water bath. The water is then heated by the aforementioned heating device. Such containers 1 are also known as "chafing dishes" and are used at buffets, for example, to keep food warm and showcase it. The container 1 is known in various embodiments, for example including flat or curved lids 10, which can be opened or closed as needed. To view the food even when the lid 10 is in the closed position, the lid can encompass a transparent region, which is formed by a glass panel or a plastic panel, for example.

The base body 2 typically comprises a bottom surface 3, a front wall 4, a rear wall 5 and two side walls 6, 7 and is often designed in one piece. The rear wall 5 in general comprises a substantially flat or straight section, which is connected to the side walls 6, 7 via curved transition regions 8. The base body 2 is generally made of a metallic material, which is preferably acid-proof, rust-proof, tasteless, easy to clean and dishwasher-proof, wherein stainless steel, such as Cromargan®, represents a preferred material in many instances.

Apart from the optional transparent region, the lid 10 can likewise be at least predominantly made of a metallic material, such as stainless steel, preferably Cromargan®. The lid 10 can comprise a handle 11, which facilitates the opening and closing of the lid 10 by hand.

The following description addresses various aspects of the container 1. According to a first aspect, at least one brake 50 for braking (decelerating) a pivoting movement of the lid 10 and/or for holding the lid 10 in a position between a closed position and an open position is provided. According to a further aspect of the present invention, at least one connecting module 20 is provided, which connects the lid 10 to the base body 2. As described below, the brake 50 and the connecting module 20 can be combined with one another.

First, the connecting module 20 and the features thereof will be addressed. An exemplary connecting module 20 is illustrated in greater detail in FIG. 6, which shows a detail of the container 1 of FIGS. 1-5. Additional views, sectional illustrations and exploded drawings of the connecting element 20 are shown in FIGS. 7-19.

Figure 1:
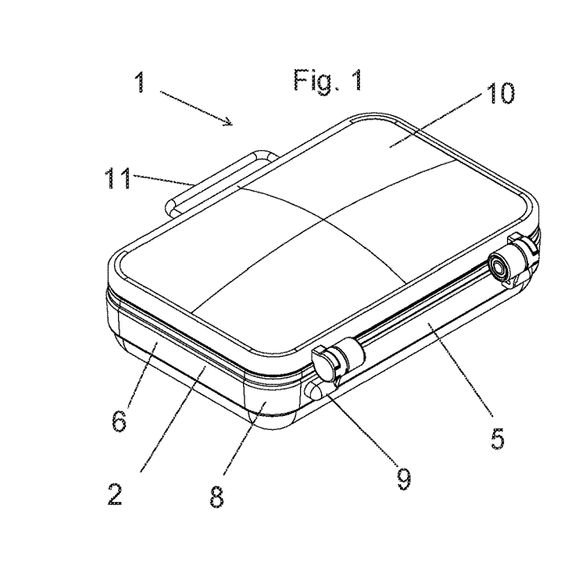
FIGS. 1-5 schematically show differing views of a container for receiving, keeping warm and/or serving food.
Figure 2:
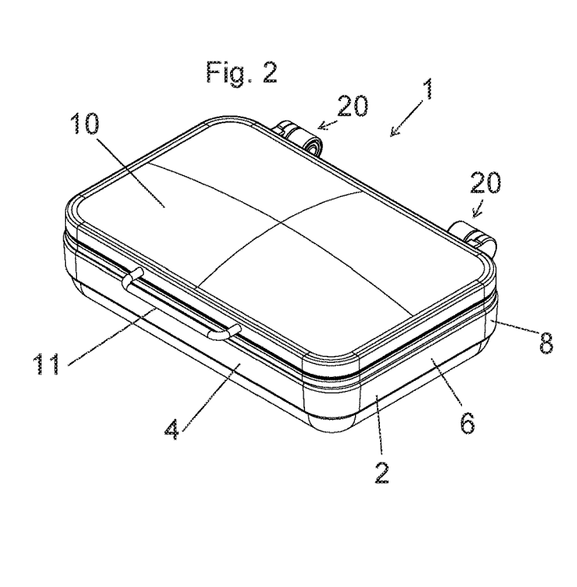
Figure 3:
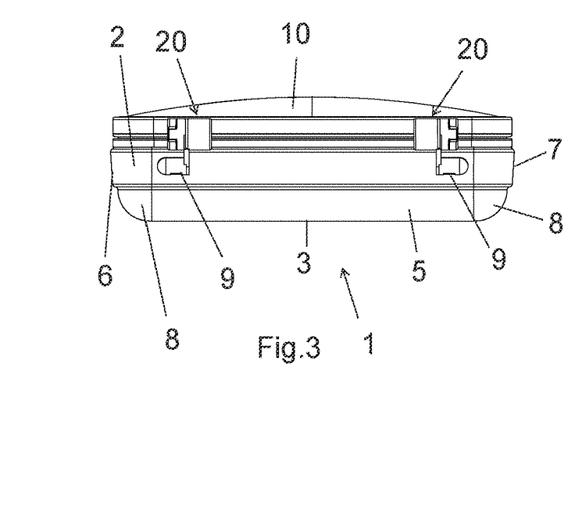
Figure 4:
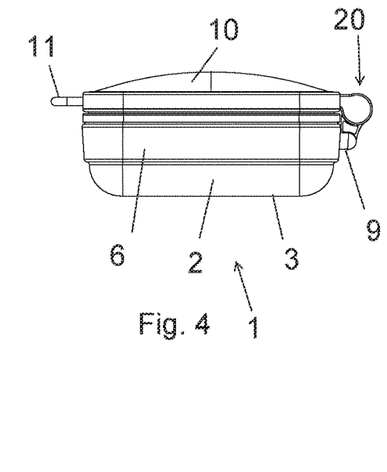
Figure 5:
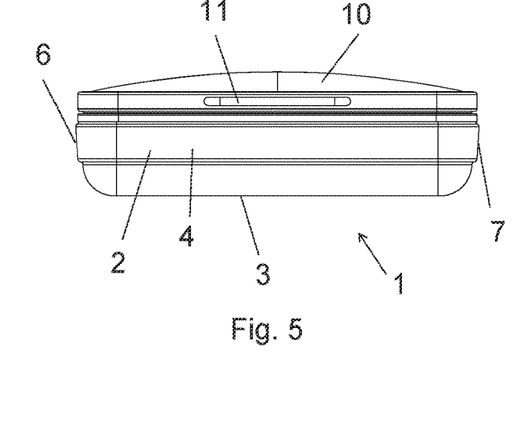
Figure 6:
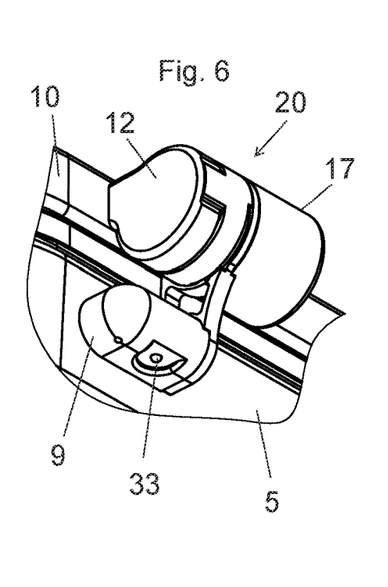
FIG. 6 shows a detailed view of the container according to FIGS. 1-5 comprising a connecting module for connecting a lid to a base body.

The connecting module 20 makes modular coupling of the lid 10 to the base body 2 possible. In particular, the connecting module 20 can be demounted both from the base body 2 and from the lid 10. Due to the modularity of the coupling, the elements 2, 10, 20 of the container 1 can be individually replaced, repaired and/or cleaned.

The connecting module 20 comprises at least one component 50 for influencing a pivoting movement of the lid 10. The aforementioned component can in particular comprise or be the brake 50. As an alternative or in addition, the aforementioned component can comprise or be a motor element, which is not shown, for moving the lid 10 between the closed position and the open position. The connecting module 20 can comprise a housing 17 comprising a first housing part 18 and a second housing part 19, which can accommodate the aforementioned component 50.

The connecting module 20 furthermore comprises a first connecting element 21, which is detachably connected to the lid 10. The first connecting element 21 usually comprises a first form fit element 22, which is designed as an elongated protrusion and can be connected to a first counter-piece 12, which is attached to or integrally formed on the lid 10, for forming a first form fit, wherein the counter-piece 12 is shaped in a manner that is complementary to the first form fit element 22.

Figure 20:
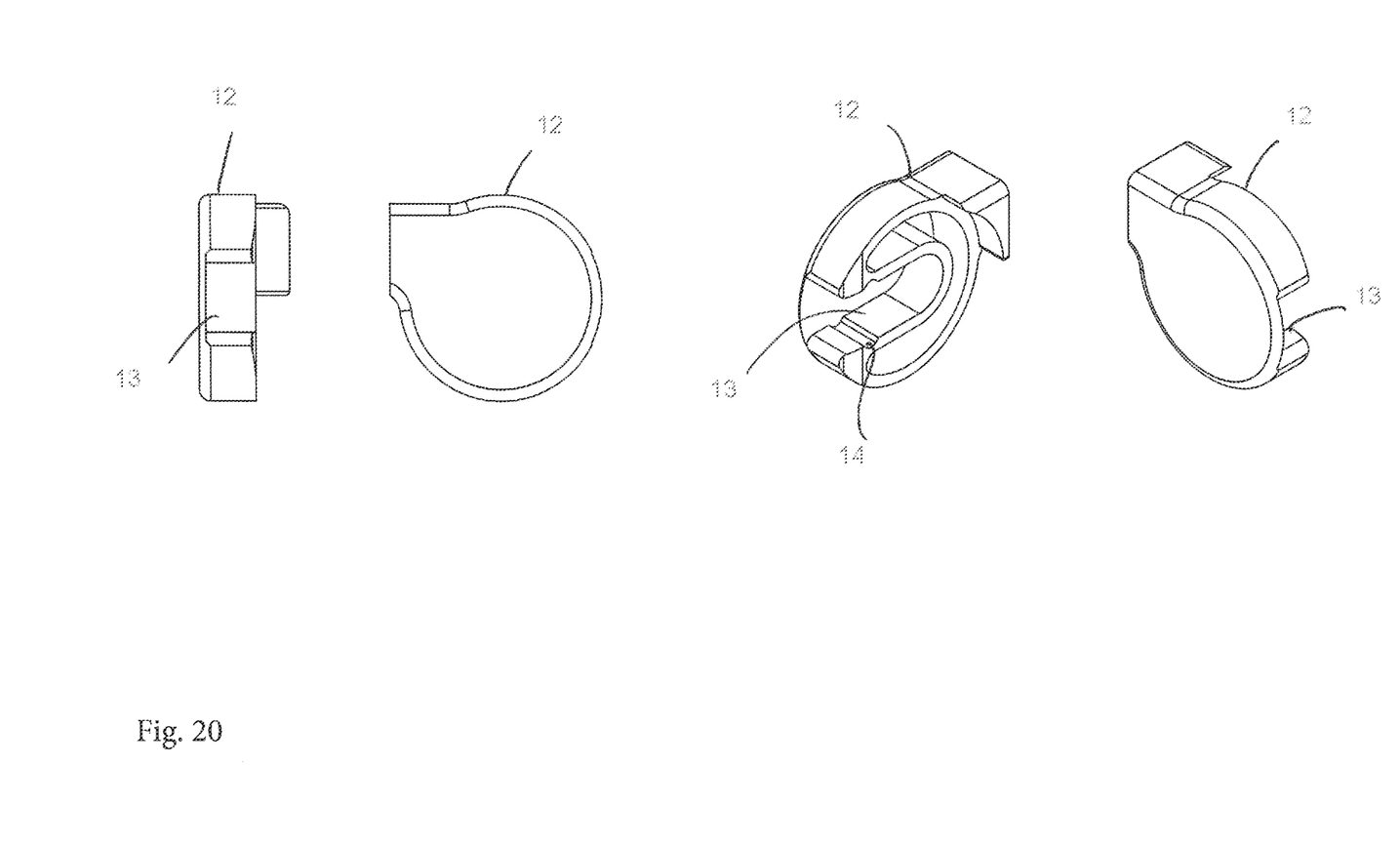
FIG. 20 shows different views of a form fit element attached to the lid.

Various views of the form fit element 12 or of the counter-piece 12 which is attached to or integrally formed on the lid 10 are shown in FIG. 20. In the shown exemplary embodiment, the first counter-piece 12 includes a first elongated receptacle 13, which accommodates the first form fit element 12 in a form-locked manner. The first connecting element 21 is non-rotatably connected to the lid 10 as a result of the first form fit and the elongated shape of the first form fit element 22. A first locking depression 14 can be formed in the first receptacle 13 of the counter-piece.

The first form fit element 22 can be integrally designed with the first housing part 18. As an alternative, the first form fit element 22 can also be present as a separate component that is connected to the first housing part 18. A longitudinal axis 41 of the first form fit element 22 can be oriented at an angle, for example perpendicularly, with respect to the pivot axis 40 of the lid 10. An orientation of the longitudinal axis 41 in general furthermore depends on the instantaneous opening angle of the lid 10.

Figure 7:
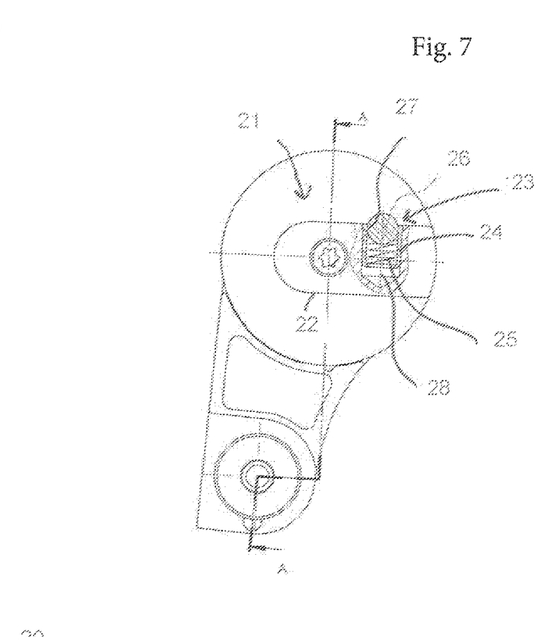
FIG. 7-9 schematically show differing views of the connecting module of FIG. 6.
Figure 8:
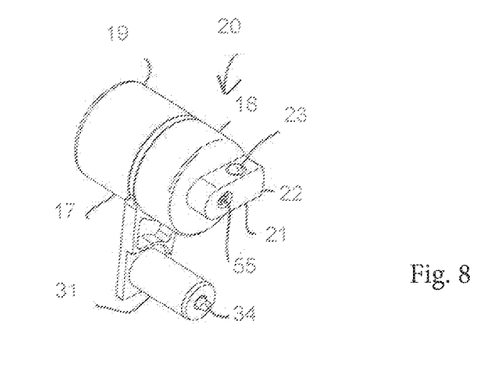
Figure 9:
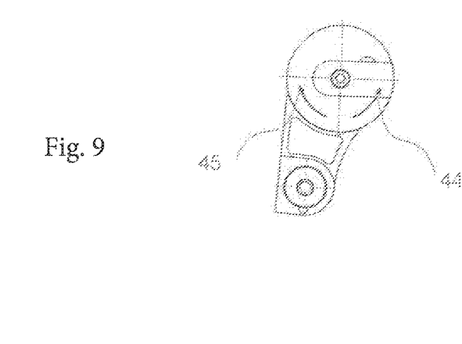

In addition, a first spring-loaded pressure piece 23 (spring plunger 23) is provided, which latches in the first locking depression 14 when the first form fit is present. The first spring-loaded pressure piece 23 thus supports the retention of the first form fit element 22 in the first receptacle 13 of the counter-piece 12. The first counter-piece 23 is arranged in a depression 28 that is formed in the first form fit element 22 and can be configured as a borehole. FIG. 7 contains a partial sectional illustration of the first pressure piece 23. The pressure piece 23 in general comprises a sleeve 24, a compression spring 25 and an element 26 preloaded by the compression spring 25, which can be designed as a ball or pin, for example. The preloaded element 26 protrudes partially from the sleeve 24 and is usually held in the sleeve 24 by means of a protrusion 27 that is formed by the sleeve 24 and protrudes radially to the inside. The sleeve 24 is attached in the depression 28. Optionally, the sleeve 24 may be omitted. In this case, the spring 25 and the preloaded element 26 are arranged directly in the depression 28.

A longitudinal axis of the first form fit element 22 and a longitudinal axis of the first receptacle 13 are often perpendicularly oriented with respect to the force of gravity when the lid 10 is closed. When the lid 10 has an opening angle of 90°, the aforementioned longitudinal axes of the elements 22, 13 extend parallel to force pf gravity. If the lid 10 is lifted in this position, the pressure piece 23 is released from the locking depression 14 so that the first form fit can be released, and the lid 10 can be removed from the connecting module 20.

In the shown example, the first form fit element 22 is thus accommodated by the first receptacle 13 of the counter-piece 12. As an alternative, it may also be provided that the first form fit element accommodates the counter-piece (not shown). In this case, the first form fit element includes a first receptacle, which preferably has a locking depression. In this case, the counter-piece is furthermore configured as a protrusion, which can be accommodated by the first receptacle in a form-locked manner. The counter-piece attached to the lid can then comprise the first spring-loaded pressure piece.

Furthermore, the connecting module 20 comprises a second connecting element 31, which is detachably connected to the base body 2.

The second connecting element 31 is connected in a form-locked manner to a second counter-piece 9 provided at the base body 2. For this purpose, the second connecting element 31 can comprise a second form fit element 32, which can be connected to the second counter-piece 9 for forming a second form fit. The second counter-piece 9 is shaped in a manner that is complementary to the second form fit element 32 and accommodates the second form fit element 32 in a form-locked manner. In the shown exemplary embodiment, the second counter-piece is implemented by a bearing pedestal 9, wherein the second form fit element 32 is configured as a stud. Hereafter, reference is therefore made to the bearing pedestal 9 and the stud 32. However, other complementary shapes are also conceivable for the second form fit. A longitudinal axis 42 of the stud, that is, of the second form fit element 32, in general extends parallel to the pivot axis 40 of the lid 10, preferably perpendicularly to the longitudinal axis 41, and often times perpendicularly to the force of gravity.

The bearing pedestal 9 usually has a second receptacle 15, which accommodates the stud 32 in a form-locked manner. A second locking depression 16 can be formed in the inner wall of the second receptacle 15.

Furthermore, a second spring-loaded pressure piece 33 (spring plunger 33) can be installed in the stud 32, which latches in the second locking depression 16 when the second form fit is present. A longitudinal axis of the second spring-loaded pressure piece 33 usually extends at an angle with respect to the longitudinal axis 42 of the stud 32, wherein a preferred angle can range between 80° and 100°, and in particular is approximately 90°.

The second locking depression 16 can be configured as a through-opening in the bearing pedestal 9, through which the second spring-loaded pressure piece 33 extends. As a result, a user has access from the outside to the second spring-loaded pressure piece 33 and can actuate this by pushing it with a finger. Thereafter, the second form fit can be released.

Optionally, a third spring-loaded pressure piece 34 can be provided, which can be configured, on the one hand, to fix/center the second form fit when the second pressure piece 33 latches in the second locking depression 16 and, on the other hand, to support the release of the second form fit when the second pressure piece 33 is pushed out of the second locking depression 16. The third spring-loaded pressure piece 34 is preferably likewise installed in the stud 32, but can alternatively also be arranged in the second receptacle 15 in the bearing pedestal 9. The third spring-loaded pressure piece 34 is preloaded in the latched state of the second spring-loaded pressure piece 33 and rests against an inner wall of the second receptacle 15. Optionally, the third spring-loaded pressure piece 34 can engage in a third locking depression 35, which is formed in the receptacle 15. In one embodiment, which is likewise apparent in the figures, a longitudinal axis of the third spring-loaded pressure piece 34 extends parallel to the longitudinal axis 42 of the stud 32, and thus perpendicularly to the longitudinal axis of the second spring-loaded pressure piece 33. When the second pressure piece 33 is released from the second locking opening 16, the third spring-loaded pressure piece 34 pushes the stud 32 at least partially out of the second receptacle 15. In this way, the connecting module 20, during the actuation of the second spring-loaded pressure piece 33, moves out of the bearing pedestal 9 due to the spring force of the third spring-loaded pressure piece 34, so as to provide haptic and/or acoustic feedback to the user that the connecting module 20 or the brake 50 has been released and is ready for removal.

The second pressure piece 33 and/or the third pressure piece 34 can have a similar design as the first pressure piece 23. For example, the respective pressure piece 33, 34 can comprise a sleeve, a compression spring and an element preloaded by the compression spring, which can be designed as a ball or pin, for example. The preloaded element usually protrudes partially from the sleeve and is held in the sleeve by means of a protrusion that is formed by the sleeve and protrudes radially to the inside.

In the shown example, the second form fit element 32 is thus accommodated by the second receptacle 15 of the bearing pedestal 9 in a form-locked manner. As an alternative, it may also be provided that the second form fit element accommodates the counter-piece (not shown). In this case, the second form fit element includes a second receptacle, which preferably has a second locking depression. In this case, the counter-piece is furthermore configured as a protrusion, which can be accommodated by the second receptacle in a form-locked manner. The protrusion attached to or formed on the base body 2 can then comprise the second spring-loaded pressure piece and the third spring-loaded pressure piece.

The connecting module 20 can comprise a rigid center piece 29, which is connected to the first connecting element 21 and/or to the housing 17 at a first end and to the second connecting element 31 at an opposite end.

Two connecting modules 20 are provided in the container 1 of FIGS. 1-5, which are arranged mirror-symmetrically with respect to one another. A plane of mirror symmetry typically extends parallel to the side walls 6, 7. The longitudinal axes 42 of the second form fit elements 32 configured as studs preferably point away from one another and are thus oriented anti-parallel to one another. So as to release the respective second form fit, the studs 32 thus must be pulled out of the second receptacles 15 in opposite directions. The longitudinal axes 41 of the first form fit elements 22 are preferably oriented parallel to one another and point in the same direction. By pulling on the lid or lifting the lid 10, preferably at an opening angle of approximately 90°, the first form fits can be released simultaneously. As a result of the orientation of the longitudinal axes 41, 42, additionally the second form fit can only be released after the lid 10 has been demounted from the respective connecting module 20. This prevents the connecting modules 20 from being inadvertently loaded into the dishwasher together with the lid 10. In this way, the component 50 that is typically sensitive to water and/or cleaning agents can be protected and the service life thereof can be increased.

As was already indicated above, each connecting module 20 is connected to the base body 2 by way of a bearing pedestal 9 that is attached, preferably welded, to the base body 2. Each bearing pedestal 9 is preferably arranged at an upper side of the flat section of the rear wall 5. In addition, the bearing pedestal 9 preferably abuts the transition region 8 and is thus positioned on the outside (on the right outside or left outside) of the rear wall 5. The reason for the outwardly installed connection of the connecting module 20 is that the flexural rigidity of the side walls 6, 7 and/or of the transition regions 8 is utilized. In this way, bending of the rear wall during opening and closing can be prevented, and additional rear wall reinforcements can be dispensed with (omitted).

Hereafter, the brake 50 will be addressed in greater detail. The brake 50 configured as a friction brake is provided to decelerate the pivoting movement of the lid 10, and to hold the lid 10 in a position between the closed position and the open position. By way of the brake 50, the lid 10 can be held in a plurality of positions, preferably in an infinitely adjustable manner, between the closed position and the open position.

The brake 50 comprises a freewheel 52, which defines a blocking direction 44 and a freewheeling direction 45. The blocking direction 44 corresponds to the closing direction of the lid 10 and/or the freewheeling direction 45 corresponds to the opening direction of the lid 10. In other words, the freewheel 52 is coupled to a pivoting movement of the lid 10 in such a way that the brake 50 decelerates or holds the lid 10 in the closing direction, not, however, in the opening direction. The freewheel 52 can be configured as one-way roller clutch, for example.

The lid 10 is coupled to a rotatable shaft 54, which defines an axis of rotation or pivot axis 40. The shaft 54 can have a non-circular protrusion 56 that extends in the axial direction and engages in a corresponding recess 57 in the first housing part 18 in a form-locked manner. An attachment means, such as a screw 55, can be provided to attach the shaft 54 to the first housing part 18.

Optionally, a bearing bushing 58 can be provided, which surrounds the shaft 54. The bearing bushing 58 can define an interior space of the brake 50, in which the freewheel 52 is situated. The freewheel 52 is preferably arranged radially between the bearing bushing 58 and the shaft 54. In the shown example, the freewheel 52 is arranged directly on the shaft 54, and thus no further components are present between the freewheel 52 and the shaft 54. Furthermore, two rolling bearings 60 are provided, which are arranged on both sides of the freewheel 52 on the shaft 54. The rolling bearings 60 can be designed as grooved ball bearings, for example, and are generally arranged radially between the bearing bushing 58 and the shaft 54. The rolling bearings 60 enable a rotation of the shaft 54 relative to the bearing bushing 58.

Optionally, the bearing bushing 58 can have a circumferential, radially inwardly directed protrusion 61, which in the axial direction often abuts the rolling bearings 60 on the one hand, and the freewheel 52 on the other hand. Two retaining rings 66 can be provided, which each abut the ball bearings 60 and form an axial delimitation for the ball bearings 60. The bearing bushing 58 can furthermore have a shoulder 59, which points radially outwardly. The rolling bearings 60 are likewise arranged in the interior space defined by the bearing bushing 58.

The shaft 54 can have a plurality of steps, which extend in the radial direction and are arranged next to one another in the axial direction. The elements 53, 50 and 66 can each be arranged on a step having differing radial heights.

A first cover 62 can be provided for covering the interior space of the brake 50 surrounded by the bearing bushing 58. The bearing bushing 58 can be non-rotatably connected to the first cover 62, for example by means of screws 63, which engage in the shoulder 59, for example. For sealing, a sealing element 64 such as an O-ring, which can be formed of an elastic material, can be provided between the bearing bushing 58 and the first cover 62. For further sealing, a further sealing element, such as a radial shaft seal ring 65, can be provided radially between the cover 62 and the shaft 54. The radial shaft seal ring 65 defines a region 53 which is filled with lubricant, such as grease, for lubrication and further sealing (refer to FIG. 16).

Due to the O-ring 64 and the radial shaft seal ring 65, the interior space of the brake 50, in which the one-way roller clutch 52 and the ball bearings 60 are situated, is sufficiently protected against water and moisture.

The bearing bushing 58 can be connected to a second cover 68 on the axially other side. The first cover 62 and the second cover 68 can thus be arranged on axially opposing sides of the bearing bushing 58. The second cover 68 preferably has an internal thread for this purpose, which can be screwed to an external thread of the bearing bushing 58. A spacer ring 67 or a spacer sleeve can be arranged axially between the second cover 68 and the bearing bushing. A retaining ring O-ring 69 can be provided axially between the second cover 68 and the second housing part 19. The O-ring is used for sealing against liquids from the outside, which other-wise could penetrate into the element 68 through the small thread. Preferably, for example, a sealing paste can be provided at least in regions between the elements 68, 67 and 58 so as to seal this region against moisture from the outside.

The first cover 62 and the second cover 68, together with the bearing bushing 58, can be interpreted as an inner housing, while the first housing part 18 and the second housing part 19 can be interpreted as an outer housing.

Figure 11:
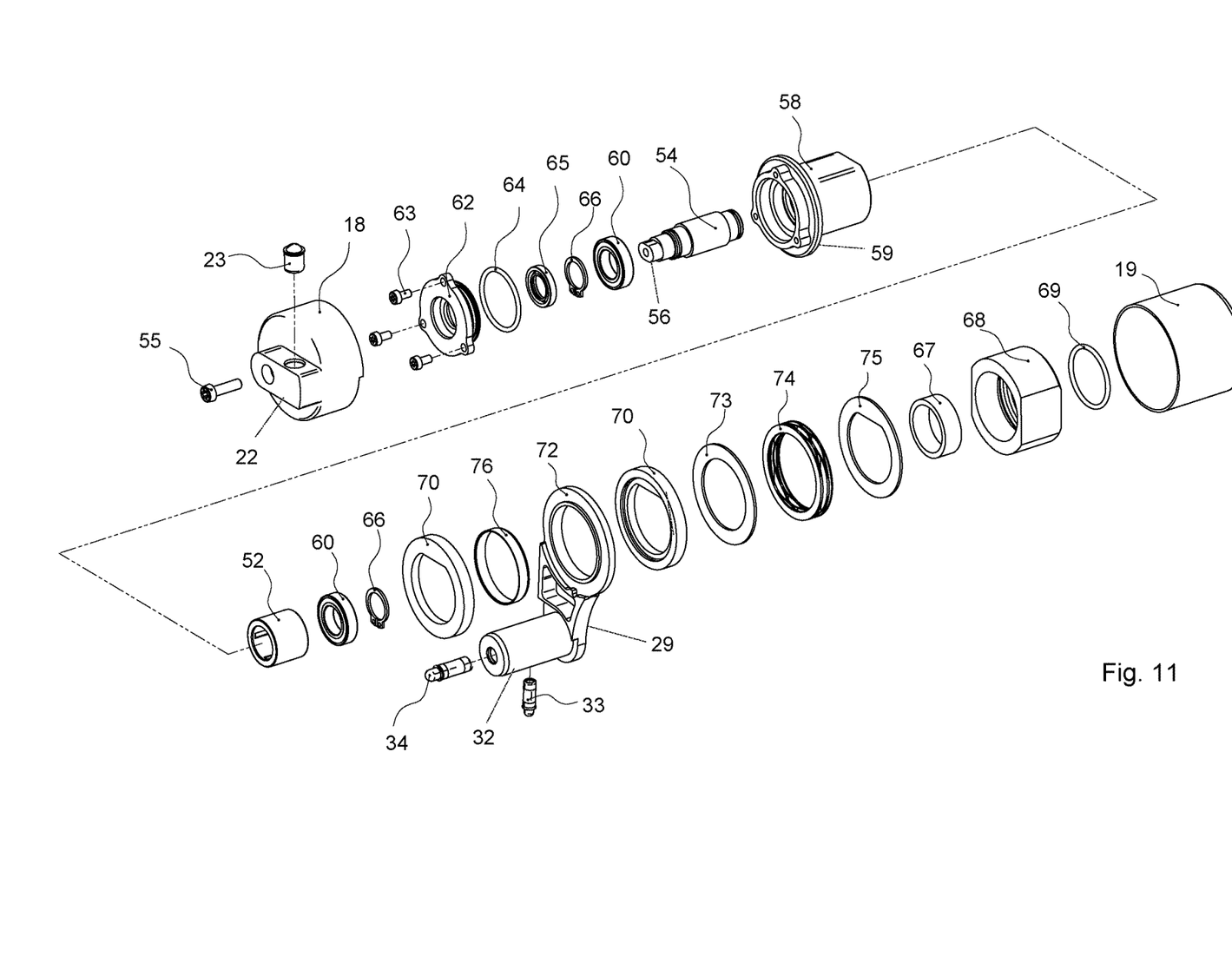
FIG. 11 shows an exploded illustration of the brake of FIG. 6.
Figure 12:
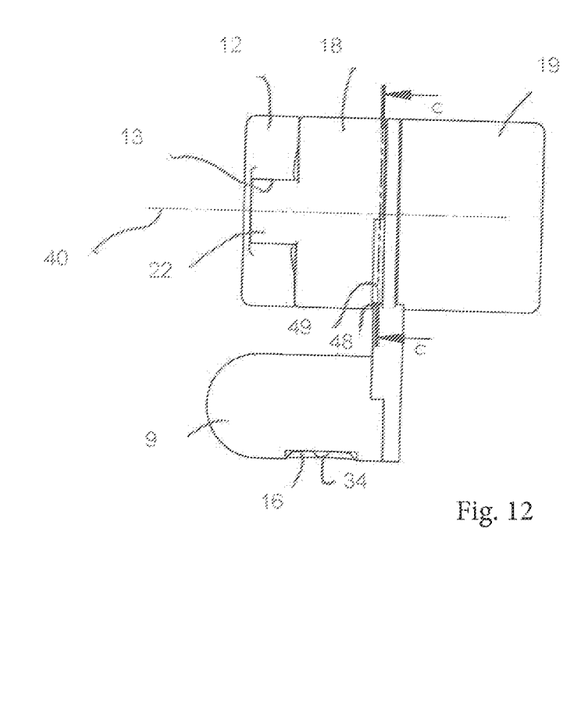
FIGS. 12-13 show two further views of the connecting module of FIGS. 6-11.
Figures 13, 14:
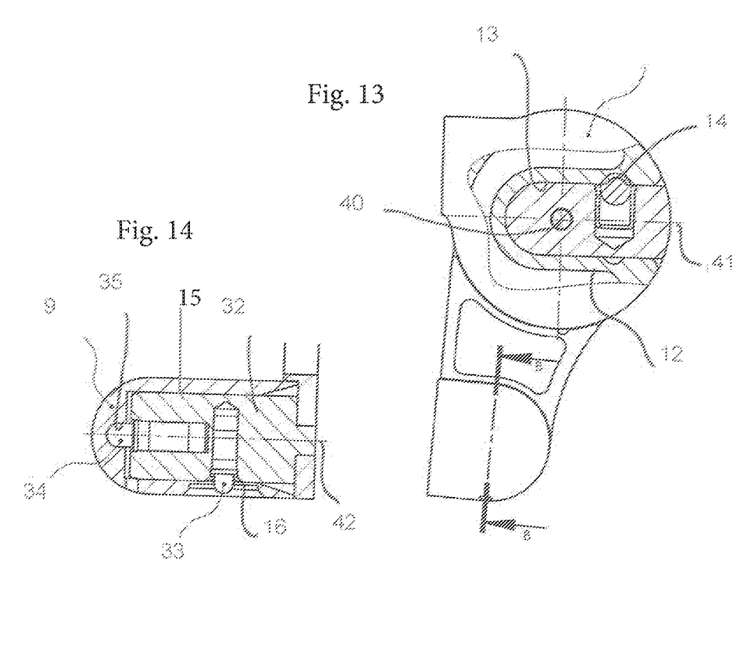
FIG. 14 shows a sectional view of a detail of the connecting module of FIG. 13 along an intersecting line B-B.
Figure 15:
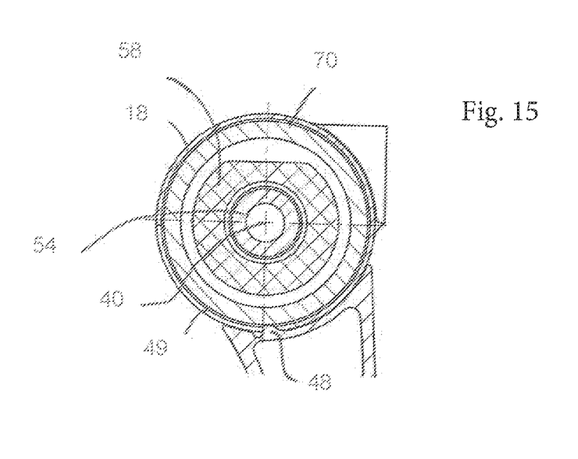
FIG. 15 shows a sectional view of a detail of the connecting module of FIG. 12 along an intersecting line C-C.

FIG. 11 shows an exploded illustration of the brake 50 or of the connecting module 20. It is apparent in FIG. 11 that the bearing bushing 58 radially on the outside, in the circumferential direction, typically comprises a round section and a flat section. The flat section of the bearing bushing 58 is in particular suitable for a rotationally fixed form fit with components arranged on the bearing bushing 58.

The brake 50 can moreover comprise at least one brake pad 70, preferably two brake pads 70, and a brake disk 72. The term "brake disk" used in this specification was selected analogously to a disk brake of a vehicle and due to the disk shape of the element 72. Deviating from a disk brake used in a vehicle, however, the brake pads 70 rotate, while the brake disk 72 is at static. Instead of the term "brake disk," it is also possible to use wording such as "brake lever" or "brake arm."

The brake pads 70 are usually arranged on the bearing bushing 58 and can comprise a flat section on the insides thereof so as to enable a rotationally fixed form fit with the bearing bushing 58. The brake disk 72 is in general fixedly connected to the rigid center piece 29, and is therefore arranged so as to be static with respect to the base body 2. The brake pads 70 are arranged in the axial direction on both sides of the brake disk 72. A spring element 74 is preferably provided, which pushes the brake pads 70 and the brake disk 72 together in the axial direction. The spring element 74 can be configured as a wave spring, for example. An adjusting washer 73, which distributes a spring force of the spring element 74 evenly on the brake pad 70, can be arranged between the brake pad 70 and the spring element 74. A further washer 75, which rests against an end face of the second cover 68, can be arranged with form fit on the axially other side of the spring element 74. The purpose of this washer 75 is to prevent the wave spring 74 from becoming twisted when the second cover 68 is screwed on. A sliding bearing 76 can be arranged radially between the brake disk 72 and the bearing bushing 28, which allows the bearing bushing 58 to be rotated relative to the brake disk 72.

The largest possible opening angle of the lid 10 can be established by a stop 48 present at the center piece 29, wherein the stop 48 is sometimes referred to as a nose. This stop 48 thus limits the pivoting movement of the lid 10. The stop 48 engages in a slot-shaped recess 49, which runs, for example, axially between the brake disk 72 and the first housing part 18 and extends in the circumferential direction.

Figure 10:
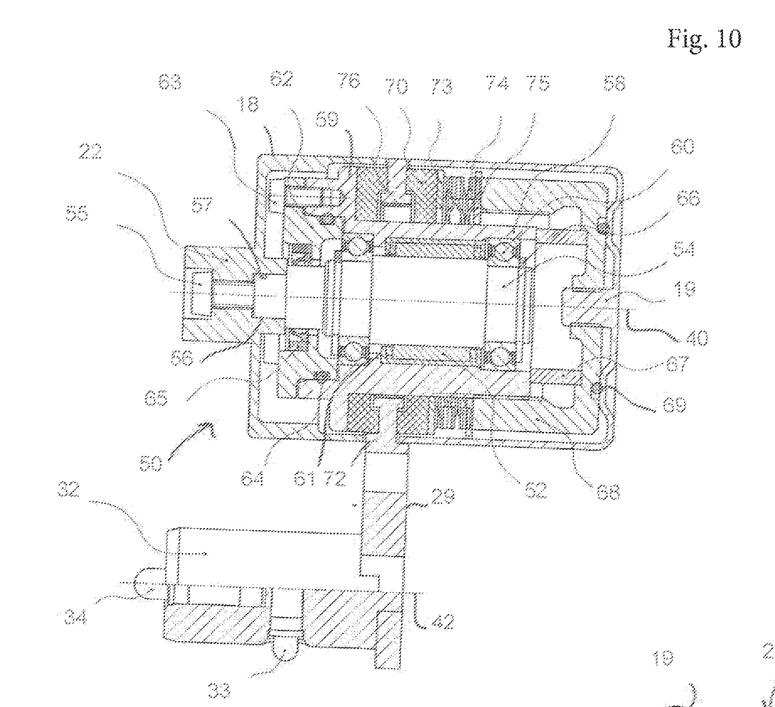
FIG. 10 shows a sectional view of the connecting module along an intersecting line A-A of FIG. 7 including a brake.
Figure 16:
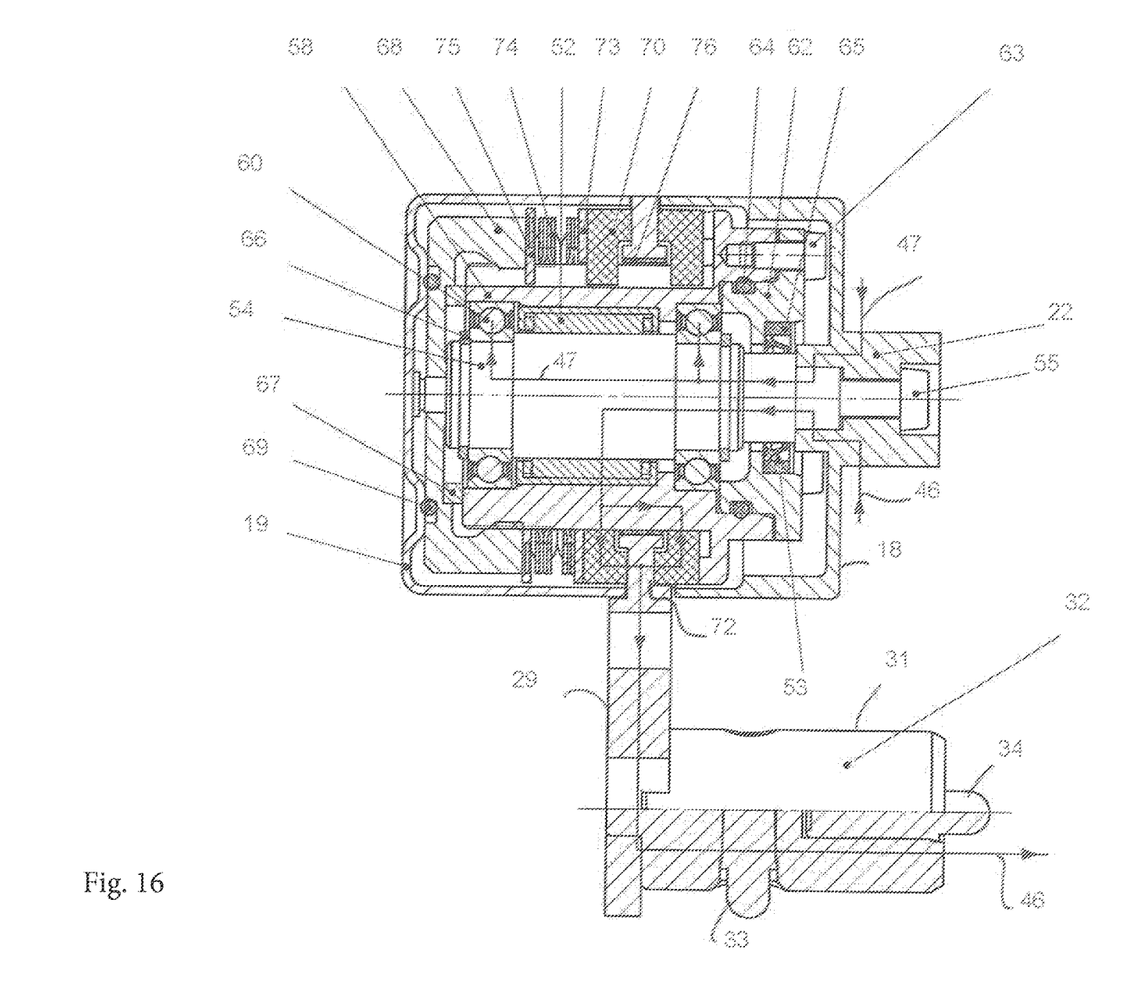
FIG. 16 shows a sectional view of a further brake including plotted flows of force.

The mechanism of action of a similar brake 50 is described hereafter based on FIG. 16. FIG. 16 shows a section of a brake 50 and of a connecting module 20, which are attached at the left of the container 1, while the brake 50 and the connecting module 20 of FIG. 10 are attached at the right of the container 1. Moreover, the brake 50 of FIG. 16 is designed axially slightly shorter than the brake 50 of FIG. 10. Functionally equivalent features are denoted by identical reference numerals, and a repetition of the description is dispensed with here.

Two flows of force are plotted in FIG. 16 by means of arrows 46, 47. The arrows 47 indicate the flow of force when the lid 10 is being opened, while the arrows 46 indicate the flow of force when the lid 10 is being closed.

As described above, the lid 10 is non-rotatably connected to the first housing part 18 and to the shaft 54 by way of the first form fit element 22. The opening direction of the lid 10 corresponds to the freewheeling direction 45 of the shaft 54 and of the freewheel 52, so that the shaft 54 rotates along when the lid 10 is being opened. When the lid 10 is being opened, the torque is thus not passed on to the braking mechanism, and the brake 50 is thus not actuated in this case. In this way, in particular the components 19, 58, 68, 70 do not rotate along. The at least one brake pad 70 and the brake disk 72 are static relative to one another in the freewheeling direction 45 of the shaft 54.

If, conversely, the lid 10 is rotated from an open position into a closed position, the rotation of the shaft 54 is transferred from the freewheel 52 by way of force fit to the bearing bushing 58. The torque is conducted from the bearing bushing 58 into the brake pads 70 by means for form fit. The brake pads 70 are pushed by the spring element 74 against the axial end faces of the brake disk 72. In the blocking direction 44 of the shaft 54, a relative movement of the brake pad 70 and of the brake disk 72 is decelerated (braked), and the braking action is thus generated by the friction between the brake pads 70 and the brake disk 72. Overall, the rotation of the shaft 54 and the pivoting movement of the lid 10 are thus decelerated. The force exerted on the brake disk 72 flows off via the center piece 29 and the second connecting element 21 onto the bearing pedestal 9 and the container 1. If no manual force is exerted, and only the force of gravity acts on the lid 10, the brake 50 ensures that the lid 10 is held in the position thereof. The braking force is preferably designed in such a way that the lid 10 is held in an infinitely variable manner and without play in each position between the closed position and the open position. This also means that a minor manual force for overcoming the holding force of the brake 50 is required for closing the lid 10. This required manual force is the greatest in a completely open position at approximately 90°, and steadily decreases when the lid 10 is being closed due to the growing influence of the force of gravity.

The sliding bearing 76 arranged between the brake disk 72 and the bearing bushing 58 allows a relative rotational movement of the bearing bushing 58 relative to the brake disk 72. When the lid 10 is being closed, amongst others the components 19, 58, 68, 70 and the components non-rotatably connected thereof thus also rotate along.

Figure 17:
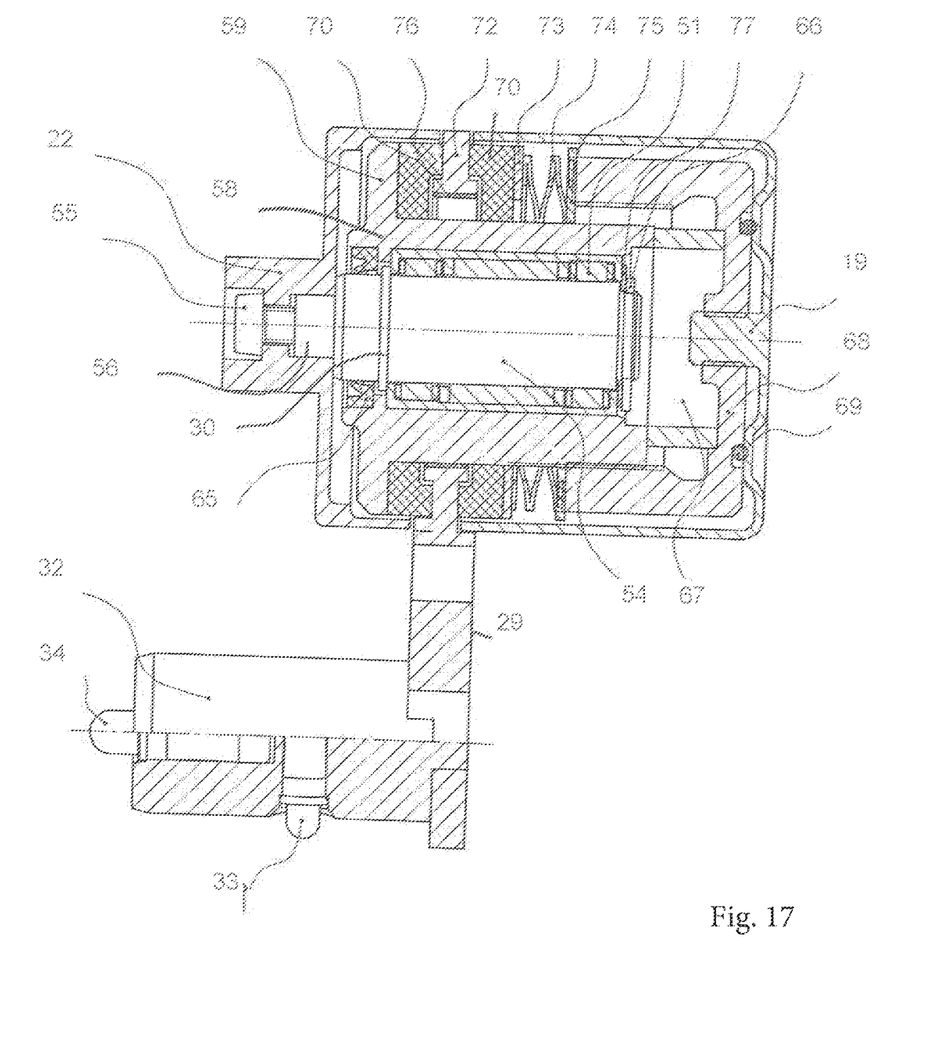
FIG. 17 shows a sectional view of a further brake.
Figure 18:
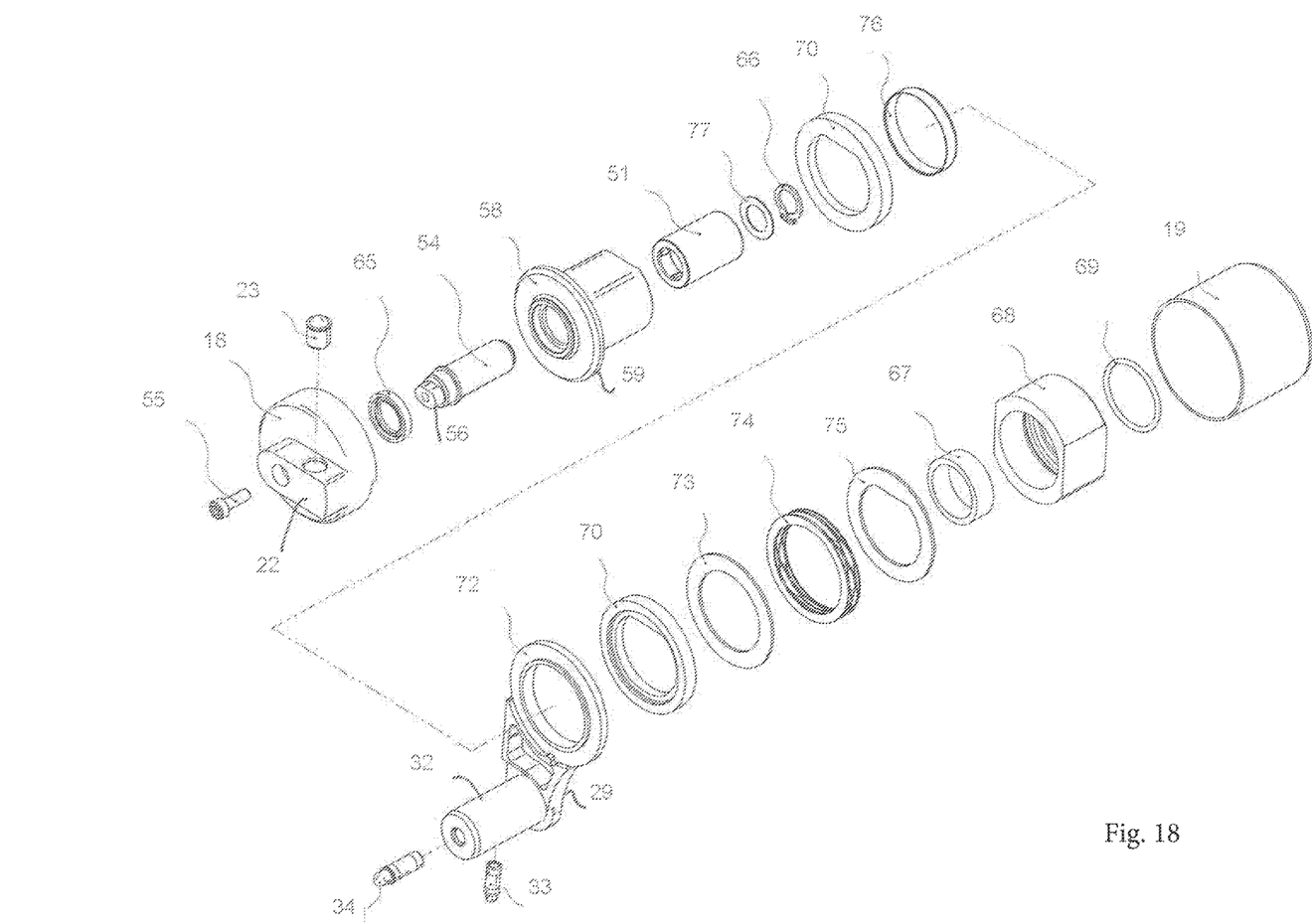
FIG. 18 shows an exploded illustration of the connecting module of FIG. 17.

FIG. 17 shows a longitudinal sectional view of a similar brake 50, which has a simpler design than the brake 50 shown in the sectional illustration in FIG. 10. In FIG. 17, identical features are denoted by identical reference numerals, and a repetition of the description is dispensed with here.

The brake 50 comprises a freewheel 51, which is configured as a one-way roller clutch and in which two rolling bearings are integrated. In this way, the separate rolling bearings 60 of FIG. 10 can be dispensed with. Moreover, the first cover 62 is dispensed with in the embodiment of FIG. 17. An optional radial shoulder 30 of the shaft 54 delimits the freewheel 51 in the axial direction, so that a retaining ring 66 can also be dispensed with in this region. On the other side of the shaft 54, an adjusting washer 77 is arranged axially between the retaining ring 66 and the freewheel 51. Overall, the brake 50 of FIG. 17 thus requires fewer components than the brake 50 of FIG. 10, see also the exploded drawing of the brake 50 in FIG. 18.

Figure 19:
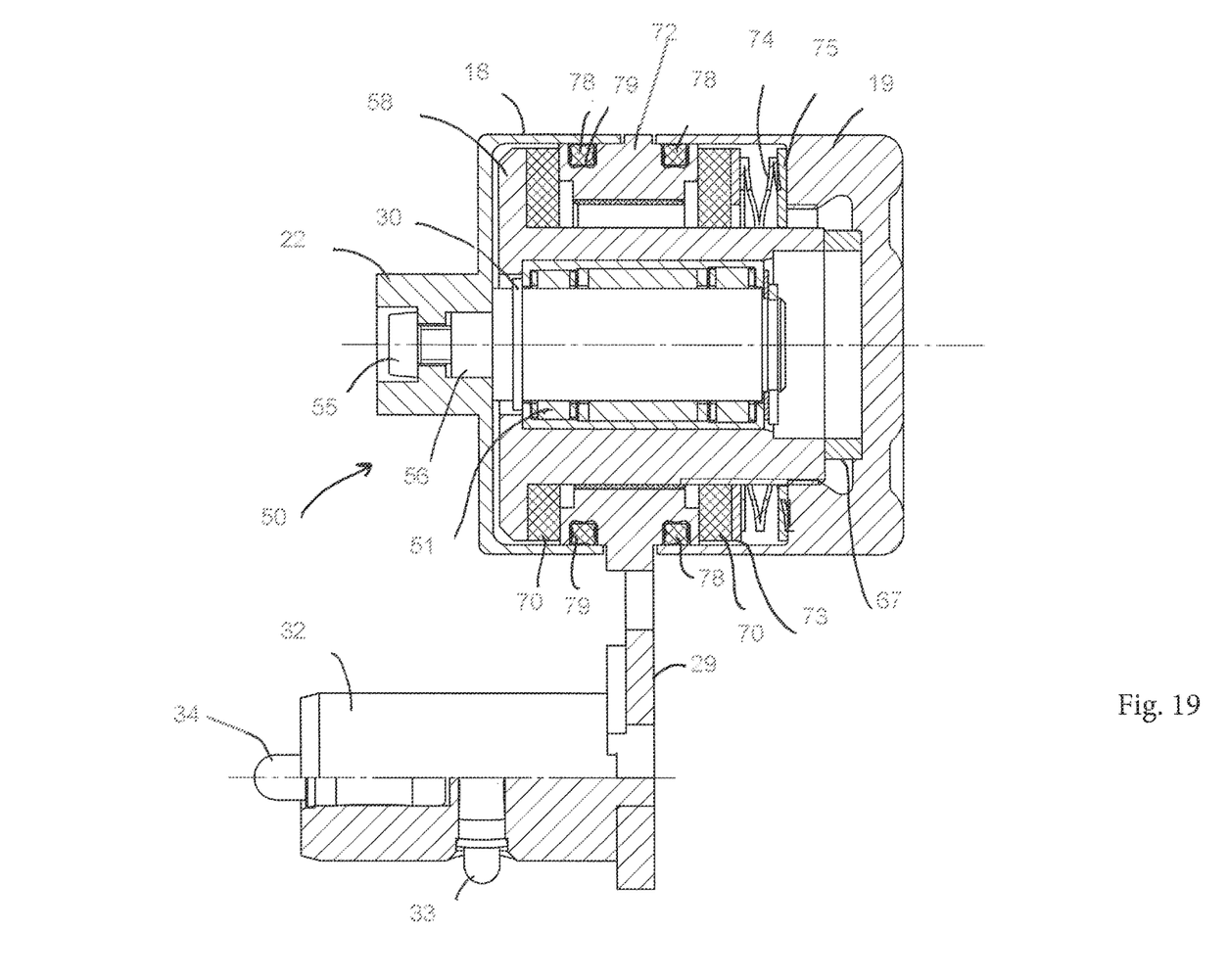
FIG. 19 shows a sectional view of a further brake.

Another embodiment of the brake 50 is shown in FIG. 19, which discloses a longitudinal sectional view of the brake 50.

The brake of FIG. 19 resembles the brake 50 of FIG. 17 to the effect that the rolling bearings are integrated into the freewheel 51, and the first cover 62 of the brake 50 of FIG. 10 was dispensed with. Instead of the radial shaft seal ring 65 of FIG. 17, however, an optional sealing ring 78 is provided in the brake of FIG. 19, which seals the system radially to the outside. The sealing ring 78 is typically located between the brake disk 72 and the first partial housing 18. The sealing ring 78 is preferably recessed in a groove 79 of the brake disk 72. A further sealing ring 78 can be arranged between the brake disk 72 and the second partial housing 19, preferably likewise in a groove 79 of the brake disk 72. Since the lateral surfaces of the partial housings 18, 19 which make contact with one another move relative radially with respect to the seals 78, quad rings can optionally be selected for the seals 78, which in general have a lubricant reservoir, whereby friction is minimized. In the region of the screw 55 and/or between the shaft 56 and the bearing shoulder of the first housing part 18, a sealing paste and/or an additional sealing element can also be provided for sealing so as to shield the system against moisture from the outside.

Another special feature of the embodiment of FIG. 19 is that the second cover 68 was dispensed with. Instead, the second housing part 19 is directly connected to the bearing bushing 58, typically by way of a screw connection. In this way, fewer parts are needed.

LIST OF REFERENCE NUMERALS 1 container
2 base body
3 bottom surface
4 front wall
5 rear wall
6 side wall
7 side wall
8 transition region
9 bearing pedestal
10 lid
11 handle
12 first counter-piece
13 first receptacle
14 first locking depression
15 second receptacle
16 second locking depression
17 housing
18 first housing part
19 second housing part
20 connecting module
21 first connecting element
22 first form fit element
23 first spring-loaded pressure piece (spring plunger)
24 sleeve
25 compression spring
26 preloaded element
27 protrusion
28 depression
29 center piece
30 radial shoulder
31 second connecting element
32 second form fit element
33 second spring-loaded pressure piece (spring plunger)
34 third spring-loaded pressure piece (spring plunger)
35 third locking depression
40 pivot axis of the lid
41 longitudinal axis of the first form fit element 22
42 longitudinal axis of the second form fit element 32
44 blocking direction
45 freewheeling direction
46 flow of force when closing of the lid
47 flow of force when opening of the lid
48 stop
49 slot-shaped recess
50 brake
51 freewheel
52 freewheel
53 region filled with lubricant
54 shaft
55 attachment means
56 axial protrusion
57 recess
58 bearing bushing
59 shoulder
60 rolling bearing
61 protrusion
62 first cover
63 screw
64 O-ring
65 radial shaft seal ring
66 retaining ring
67 spacer ring
68 second cover
69 O-ring
70 brake pad
72 brake disk
73 adjusting washer
74 spring element
75 disk with form fit
76 sliding bearing
77 adjusting washer
78 quad ring
79 groove

The invention claimed is:

1. A container, in particular for receiving, keeping warm and/or serving food, comprising:
   a trough-shaped base body;
   a lid for closing the base body configured to be pivoted between a closed position and an open position; and
   a connecting module for connecting the lid to the base body,
   the connecting module comprising a first connecting element, which is detachably connected to the lid,
   the connecting module comprising a second connecting element, which is detachably connected to the base body,
   the connecting module comprising at least one component for influencing a pivoting movement of the lid,
   wherein the first connecting element comprises a first form fit element, configured to be connected to a first counter-piece attached to the lid for forming a first form fit,
   wherein a first spring plunger is provided, which latches in a first locking depression when the first form fit is present.

2. The container according to claim 1, wherein the first spring plunger is installed in the first form fit element, and the first locking depression is formed in the first counter-piece.

3. The container according to claim 1, wherein, at a certain opening angle of the lid, a longitudinal axis of the first form fit element and a longitudinal axis of the first counter-piece extend parallel to a force of gravity, so that the form-locked connection between the lid and the first connecting element is configured to be released by lifting of the lid.

4. The container according to claim 1, wherein the second connecting element comprises a second form fit element, configured to be connected to a second counter-piece, which is attached to the lid, for forming a second form fit,
   wherein a second spring plunger is provided, which latches in a second locking depression when the second form fit is present.

5. The container according to claim 4, wherein the second form fit element engages in a second receptacle formed in the second counter-piece,
   the second locking depression being formed in an inner wall of the second receptacle,
   the second spring plunger being installed in the second form fit element and extending at an angle, with respect to a longitudinal axis of the second form fit element.

6. The container according to claim 4, wherein a third spring plunger, which is preloaded when the second spring plunger is latched and which is configured to push the second form fit element at least partially out of the second receptacle when a second pressure piece is released from the second locking depression, is provided for releasing the second form fit, and wherein the third spring plunger is installed in the second form fit element and rests against the inner wall of the second receptacle when the second spring plunger is latched.

7. The container according to claim 1, wherein the connecting module comprises a housing for accommodating the at least one component.

8. The container according to claim 1, wherein at least one bearing pedestal is provided at the base body for connection to the second connecting element.

9. The container according to claim 1, wherein the base body comprises a bottom surface, a front wall, a rear wall and two side walls.

10. The container according to claim 1, the at least one component for influencing the pivoting movement of the lid comprising:
a brake for braking the pivoting movement of the lid and/or for holding the lid in a position between the closed position and the open position and/or
a motor element for moving the lid between the closed position and the open position.

11. A container, in particular for receiving, keeping warm and/or serving food, comprising:
a trough-shaped base body;
a lid for closing the base body configured to be pivoted between a closed position and an open position; and
at least two connecting modules for connecting the lid to the base body, each connecting module comprising:
a first connecting element, which is detachably connected to the lid,
a second connecting element, which is detachably connected to the base body, and
at least one component for influencing a pivoting movement of the lid,
wherein the first connecting element comprises a first form fit element, configured to be connected to a first counter-piece attached to the lid for forming a first form fit,
wherein a first spring plunger is provided, which latches in a first locking depression when the first form fit is present, and
wherein the second connecting element comprises a second form fit element, configured to be connected to a second counter-piece, which is attached to the lid, for forming a second form fit,
wherein a second spring plunger is provided, which latches in a second locking depression when the second form fit is present,
the longitudinal directions of the first form fit elements extending parallel to one another and pointing in the same direction, and the longitudinal directions of the second form fit elements extending parallel to one another, but being oriented in opposite directions.

12. The container according to claim 9, wherein the rear wall extends in a lateral direction from a first end section to a second end section, the end sections being each connected to one of the two side walls, and the connecting modules being attached to the rear wall in the end sections.

13. The container according to claim 9, wherein the connecting module is attached to an upper side of the rear wall of the base body.

14. A container, in particular for receiving, keeping warm and/or serving food, comprising:
a trough-shaped base body;
a lid for closing the base body configured to be pivoted between a closed position and an open position; and
a connecting module for connecting the lid to the base body,
the connecting module comprising a first connecting element, which is detachably connected to the lid,
the connecting module comprising a second connecting element, which is detachably connected to the base body,
the connecting module comprising at least one component for influencing a pivoting movement of the lid,
wherein the second connecting element comprises a second form fit element, configured to be connected to a second counter-piece, which is attached to the lid, for forming a second form fit,
wherein a second spring plunger is provided, which latches in a second locking depression when the second form fit is present.

15. The container according to claim 14, wherein the second form fit element engages in a second receptacle formed in the second counter-piece,
the second locking depression being formed in an inner wall of the second receptacle,
the second spring plunger being installed in the second form fit element and extending at an angle with respect to a longitudinal axis of the second form fit element.

16. The container according to claim 14, wherein a third spring plunger, which is preloaded when the second spring plunger is latched and which is configured to push the second form fit element at least partially out of the second receptacle when a second pressure piece is released from the second locking depression, is provided for releasing the second form fit, and
wherein the third spring plunger is installed in the second form fit element and rests against the inner wall of the second receptacle when the second spring plunger is latched.

17. The container according to claim 14, wherein the connecting module comprises a housing for accommodating the at least one component.

18. The container according to claim 14, wherein at least one bearing pedestal is provided at the base body for connection to the second connecting element.

19. The container according to claim 14, wherein the base body comprises a bottom surface, a front wall, a rear wall and two side walls.

20. The container according to claim 14, the at least one component for influencing the pivoting movement of the lid comprising:
a brake for braking the pivoting movement of the lid and/or for holding the lid in a position between the closed position and the open position and/or
a motor element for moving the lid between the closed position and the open position.

* * * * *